United States Patent
Bill

(10) Patent No.: US 12,065,001 B2
(45) Date of Patent: Aug. 20, 2024

(54) TIRE INFLATION OPTIMISATION

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 301 days.

(21) Appl. No.: 17/551,731

(22) Filed: Dec. 15, 2021

(65) Prior Publication Data
US 2022/0185036 A1 Jun. 16, 2022

(30) Foreign Application Priority Data

Dec. 16, 2020 (GB) ...................................... 2019860

(51) Int. Cl.
| | | |
|---|---|---|
| *B60C 23/00* | (2006.01) | |
| *B60C 23/04* | (2006.01) | |
| *B64C 25/36* | (2006.01) | |
| *G08G 5/00* | (2006.01) | |

(52) U.S. Cl.
CPC ........ B60C 23/001 (2013.01); B60C 23/0484 (2013.01); B64C 25/36 (2013.01); G08G 5/003 (2013.01); *B60C 2200/02* (2013.01)

(58) Field of Classification Search
CPC .............. B60C 23/001; B60C 23/0484; B60C 2200/02; B64C 25/36; G08G 5/003
See application file for complete search history.

(56) References Cited

U.S. PATENT DOCUMENTS

| | | | |
|---|---|---|---|
| 9,505,502 B2* | 11/2016 | Miller | ................. B60C 23/0408 |
| 2012/0075089 A1* | 3/2012 | Miller | ................... B60C 23/066 340/443 |
| 2015/0005982 A1* | 1/2015 | Muthukumar | ........ B60T 8/1725 701/1 |

(Continued)

FOREIGN PATENT DOCUMENTS

| | | |
|---|---|---|
| EP | 3 069 904 A1 | 9/2016 |
| GB | 2536497 | 9/2016 |
| GB | 2540414 | 1/2017 |

OTHER PUBLICATIONS

Esmaeeli, R, Aliniagerdroudbari, et al.. "Optimization of a Rainbow Piezoelectric Energy Harvesting System for Tire Monitoring Applications." Proceedings of the ASME 2018 12th International Conference on Energy Sustainability (Year: 2018).*

(Continued)

*Primary Examiner* — Gertrude Arthur Jeanglaude
(74) *Attorney, Agent, or Firm* — Nixon & Vanderhye P.C.

(57) ABSTRACT

A tire inflation optimization apparatus configured to determine an optimum inflation pressure for a tire installed on an aircraft is disclosed. The apparatus includes a memory and a controller. The memory stores information relating tire gas properties to aircraft schedule parameters and a reference pressure for the tire. The controller is configured to receive future schedule information indicative of a future flight schedule for the aircraft and to determine an optimum inflation pressure for the tire based on the received future schedule information, the stored information relating tire gas properties to aircraft schedule parameters, and the stored reference pressure.

22 Claims, 4 Drawing Sheets

(56) References Cited

U.S. PATENT DOCUMENTS

2015/0224831 A1* 8/2015 Miller ................ B60C 23/0408
　　　　　　　　　　　　　　　　　　701/32.4

OTHER PUBLICATIONS

Extended European Search Report for Application No. EP 21213741. 8, seven pages, dated May 11, 2022.
United Kingdom Search Report for GB2019860.2, dated May 18, 2021, 4 pages.

* cited by examiner

TIRE INFLATION OPTIMISATION

CROSS RELATED APPLICATION

This application claims priority to United Kingdom Patent Application GB 2019860.2, filed Dec. 16, 2020, the entire contents of which is hereby incorporated by reference.

TECHNICAL FIELD

The present invention relates to a tire inflation optimisation apparatus, to a method of determining an optimum inflation pressure for an aircraft tire, and to an aircraft.

BACKGROUND

The pressure of gas in an aircraft tire should be maintained within a certain range throughout operation of the aircraft, in order to ensure safe operation. The pressure range is set by the aircraft manufacturer and the tire manufacturer based on the properties of the aircraft and of the tire and is specified by the aircraft maintenance manual (AMM) of the aircraft.

Tire pressure varies with temperature, and in particular increases with increasing temperature. The temperature of the tire gas at a particular point in a flight cycle may vary between flight cycles, e.g. due to differences in the ambient temperature. Furthermore, the optimum tire pressure (that is, the pressure at which the tire deforms by an optimum amount during operation) varies according to load. Higher tire pressures are better for higher loads. The load on an aircraft tire may also vary between flight cycles, e.g. due to differing numbers of passengers and/or amounts of luggage being carried. It is important that the tire is not underinflated with respect to the load on it at any point during operation of the aircraft, as this increases the risk of tire failure. The pressure range defined in the AMM is therefore set conservatively, such that the tire pressure will not be too low even if the aircraft is operated in very low ambient temperatures and/or at its maximum weight.

This means that, for aircraft which are often operated in high ambient temperatures and/or at weights significantly less than the maximum allowed, the tires will often be slightly overinflated when inflation is performed according to the AMM. Although not a safety concern, this leads to more frequent inflation of the tires and thus more use of nitrogen gas, and faster wearing of the tire treads (and therefore more frequent replacement of the tires). It would therefore be beneficial for operators if they could reduce the amount of time for which their aircraft are operated with overinflated tires, whilst still ensuring that underinflation does not occur.

SUMMARY

A first aspect of the present invention provides a tire inflation optimisation apparatus configured to determine an optimum inflation pressure for a tire installed on an aircraft. The apparatus comprises a memory and a controller. The memory stores information relating tire gas properties to aircraft schedule parameters and a reference pressure for the tire. The controller is configured to receive future schedule information indicative of a future flight schedule for the aircraft and to determine an optimum inflation pressure for the tire based on the received future schedule information, the stored information relating tire gas properties to aircraft schedule parameters, and the stored reference pressure.

Optionally, the controller is further configured to determine an optimum reinflation threshold for the tire based on the received future schedule information, the stored information relating tire gas properties to aircraft schedule parameters, and the stored reference pressure. The optimum reinflation threshold is set such that, when the pressure of the tire is measured to be less than the reinflation threshold during a routine check, reinflation of the tire is triggered.

Optionally, the determined reinflation threshold corresponds to the determined optimum inflation pressure, in that the determined reinflation threshold is configured to trigger the first reinflation after an inflation to the determined optimum inflation pressure.

Optionally, the tire gas properties are temperature and pressure.

Optionally, the aircraft schedule parameters include any combination of: airline operating the aircraft; departure airport; arrival airport; route; arrival time; departure time, arrival date, departure date.

Optionally, the stored information relating tire gas properties to aircraft schedule parameters has been created based on historical tire gas information covering a selected time period and historical schedule information for the aircraft covering the selected time period.

Optionally, the historical tire gas information comprises measured tire pressure values and corresponding measured tire gas temperature values.

Optionally, at least a part of the historical tire gas information relates to the tire for which an optimum inflation pressure is to be determined.

Optionally, a part of the historical tire gas information relates to a previous tire of the aircraft, the previous tire having been installed on the same wheel of the aircraft as the tire for which an optimum inflation pressure is to be determined, before the tire for which an optimum inflation pressure is to be determined was installed.

Optionally, the stored information relating tire gas properties to aircraft schedule parameters comprises one or more look-up tables, each of which links a historical tire gas parameter to a contemporaneous historical schedule parameter.

Optionally, the stored information relating tire gas properties to aircraft schedule parameters comprises a mathematical relationship linking the tire gas properties to the aircraft schedule parameters which has been derived using the historical tire gas information and the historical schedule information.

Optionally, the stored information relating tire gas properties to aircraft schedule parameters comprises a machine learning algorithm which has been trained using the historical tire gas information and the historical schedule information.

Optionally, the machine learning algorithm has been additionally trained using one or more of:
historical flight-tracking information;
historical weather information.

Optionally, the received future schedule information covers at least a maximum time period until the next inflation of the tire.

Optionally, the received future schedule information covers at least 3 days.

Optionally, the received future schedule information comprises a plurality of schedule parameters, the schedule parameters comprising any combination of: airline operating the aircraft, departure airport, arrival airport, route, arrival time, departure time, arrival date, departure date.

Optionally, the controller is further configured to receive current measured values of the tire gas temperature and tire gas pressure and current schedule information, and to update the stored information relating tire gas properties to aircraft schedule parameters based on the received current measured values and current schedule information.

Optionally, the memory further stores weight-schedule information relating aircraft weight to aircraft schedule parameters, and the controller is configured to determine the optimum inflation pressure based additionally on the received weight-schedule information.

Optionally, the memory further stores tire gas-weather information relating the tire gas properties to weather conditions, and the controller is configured to receive future weather information for the time period covered by the received future schedule information and to determine the optimum inflation pressure based additionally on the received weather prediction and the stored tire gas-weather information.

Optionally, the stored information relating tire gas properties to aircraft schedule parameters has been created based additionally on historical weather information covering the selected time period, the historical weather information being indicative of weather conditions at locations in which the aircraft was operating during the selected time period, at times when the aircraft was at those locations.

A second aspect of the invention provides a method of determining an optimum inflation pressure for an aircraft tire. The method comprises:
  receiving future flight schedule information relating to planned flights of an aircraft comprising the tire;
  receiving tire gas-schedule information relating tire gas properties to aircraft schedule parameters;
  receiving a reference pressure for the tire; and
  determining an optimum inflation pressure for the tire based on the received future flight schedule information, the received tire gas-schedule information and the received reference pressure.

Optionally, the method is configured to be performed by a controller of a tire inflation optimisation apparatus according to the first aspect.

A third aspect of the invention provides an aircraft comprising a tire in combination with a tire inflation optimisation apparatus according to the first aspect configured to predict an optimum inflation pressure for the tire.

Optionally, the aircraft further comprises a tire gas pressure sensor configured to measure a current pressure of gas in the tire and a tire gas temperature sensor configured to measure a current temperature of gas in the tire, and to provide tire gas pressure information and tire gas temperature information to the tire inflation optimisation apparatus.

BRIEF DESCRIPTION OF THE DRAWINGS

Embodiments of the invention will now be described, by way of example only, with reference to the accompanying drawings, in which.

DETAILED DESCRIPTION

The examples of the invention described herein each relate to a tire inflation optimisation apparatus configured to determine an optimum inflation pressure for a tire installed on an aircraft. Each example apparatus comprises a memory and a controller. Stored on the memory is information relating tire gas properties to aircraft schedule parameters (referred to in the following as tire gas-schedule information), and a reference pressure for the tire. The controller is configured to receive future schedule information indicative of a future flight schedule for the aircraft; and to determine an optimum inflation pressure for the tire based on the received future schedule information, the stored tire gas-schedule information, and the stored reference pressure. In some examples the controller is further configured to determine an optimum reinflation threshold for the tire based on the received future schedule information, the stored information relating tire gas properties to aircraft schedule parameters, and the stored reference pressure. The optimum reinflation threshold is set such that, when the pressure of the tire is measured to be less than the reinflation threshold during a routine check, reinflation of the tire is triggered.

The example tire inflation optimisation apparatus according to the invention are advantageously able to minimise the time a tire spends in an overinflated state, whilst also ensuring against underinflation, by taking into account how the tire pressure varies during actual operation of an aircraft on which the tire is installed. For example, when the aircraft is operating a particular route, or at a particular time of day and/or at a particular time of the year, the environmental conditions and/or the loading of the aircraft may deviate from the average in certain predictable ways which affect the tire pressure. Such relationships are captured in the tire gas-schedule information which is stored by the optimisation apparatus, and the optimisation apparatus is thereby able to predict future tire gas pressure behaviour when provided with future schedule information. The predicted future behaviour can then be used to determine an optimum inflation pressure which maximises the time for which the tire pressure is within a preferred range (that is, neither underinflated nor overinflated).

Figure 1:
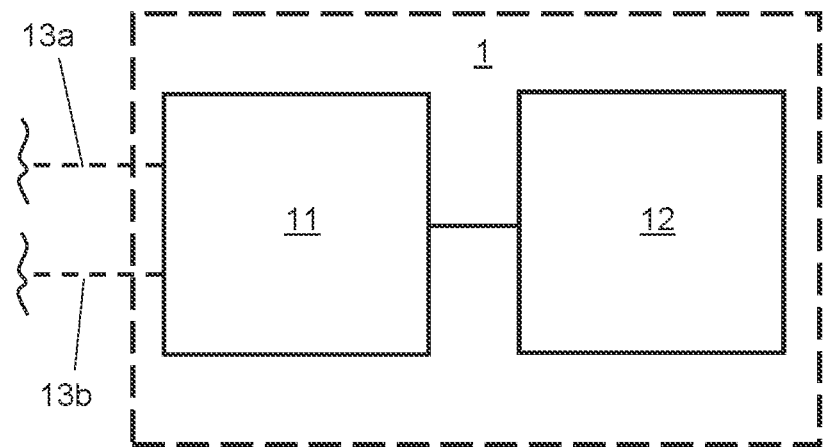
FIG. 1 is a schematic view of an example tire inflation optimisation apparatus according to the invention.

FIG. 1 is a schematic diagram of a generic example tire inflation optimisation apparatus 1 according to the invention. The apparatus 1 is configured to determine an optimum inflation pressure for a tire installed on an aircraft. The apparatus 1 comprises a controller 11 and a memory 12. The controller 11 comprises a processor to execute computer program instructions, which may be stored in the memory 12 and/or may be received via control signals. The controller 11 is configured to retrieve data from the memory 12, and may also be configured to write data to the memory 12.

The memory 12 can comprise any suitable implementation of a computer readable storage medium, such as a hard drive, flash memory, non-volatile memory, or the like. FIG. 1 shows the memory 12 and controller 11 comprised in a single unit, which may, for example, comprise a single housing containing the controller 11 and the memory 12. However, it is also possible for the memory 12 to comprise a separate unit from the controller 11, in which case the memory 12 will be connected to the controller 11 by a communications link (which may be wired or wireless). In some examples the memory 12 may be remote from the controller 11. In some such examples the memory 12 may be comprised in a cloud-based data storage system.

The memory 12 stores information relating tire gas properties to aircraft schedule parameters (tire gas-schedule information). The tire gas properties are temperature and pressure of the gas in the tire. The stored tire gas-schedule information may relate tire gas properties to one or multiple schedule parameters. The schedule parameters may be any parameters which may affect the tire gas properties. The schedule parameters may include, for example, any combination of: airline operating the aircraft; departure airport; arrival airport; route; arrival time; departure time; arrival date; departure date. The schedule parameters may be parameters which are routinely included in schedule information made available by airlines.

The stored tire gas-schedule information is configured to enable the controller 11 to determine tire gas properties (that is, temperature and pressure) corresponding to a particular set of schedule parameters (e.g. a particular route at a particular time of the year). The stored tire gas-schedule information may take various different forms, such as one or more look-up tables, one or more mathematical relationships, and/or one or more machine learning algorithms The stored tire gas-schedule information has been created based on historical tire gas information covering a selected time period and historical schedule information for the aircraft covering the same selected time period. The stored information may have been created by the controller 11, or it may have been created by a different system. Depending on the size and nature of the stored tire gas-schedule information, it may necessarily have been created by a system having more computing power than the processor of the controller 11.

Figure 2:
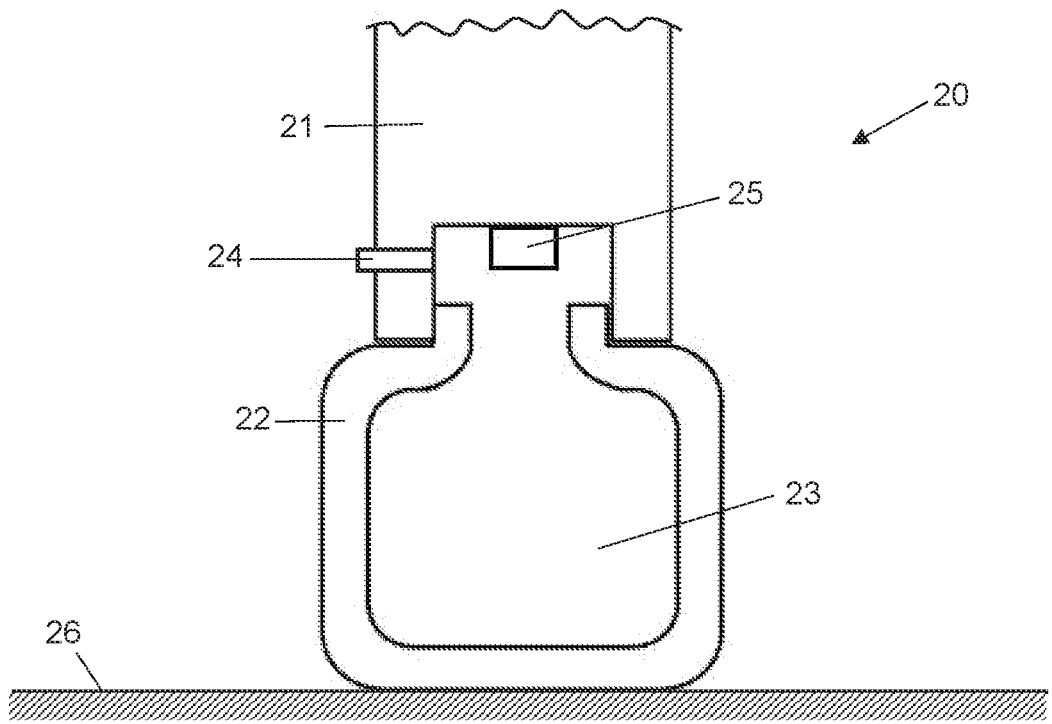
FIG. 2 is a schematic cross-section through part of an example aircraft wheel.

The historical tire gas information on which the stored information is based may comprise measured tire pressure values and corresponding measured tire gas temperature values. Each such measured tire pressure value may be associated with a measured tire gas temperature value that was measured at the same time. The historical tire gas temperature information may therefore comprise paired pressure and temperature values. The historical tire gas information may be in the form of a time series of values (or pairs of values), which extends over the selected time period. The selected time period may end at, or shortly before, the current time (that is, the time at which the optimisation apparatus 1 is determining an optimum inflation pressure). The most recent values comprised in the historical tire gas information may be values of tire pressure and tire gas temperature most recently measured by a sensor device configured to measure the pressure and temperature of gas in the tire. FIG. 2 shows an example of such a sensor device.

FIG. 2 is a cross-section through part of an example aircraft wheel assembly 20 comprising a wheel 21 and a tire 22 mounted on the wheel 21. The wheel assembly is shown resting on the ground 26. An enclosed space 23 is formed between the wheel 21 and tire 22, and this enclosed space 23 is filled with pressurised inert gas (typically nitrogen). An inflation port 24 is provided on the wheel 21, through which inert gas can be introduced to increase the pressure in the space 23. In the illustrated example the wheel assembly 20 is comprised in a nose landing gear of an aircraft, and therefore does not comprise a brake. A sensor device 25 suitable for measuring the pressure and temperature of the gas within the space 23 is mounted on the wheel 21, within the enclosed space 23 formed by the wheel 21 and tire 22. The sensor device 25 is configured to measure the temperature and pressure of the tire gas, either continuously or periodically, during the operation of an aircraft in which the wheel assembly 20 is comprised. The sensor device 25 may be further configured to provide the measured values to the tire inflation optimisation apparatus 1, in any suitable manner (such as via a wireless communications link). In such examples the controller 11 of the optimisation apparatus 1 may be configured to update the stored tire gas-schedule information based on measured temperature and pressure values newly received from the sensor device 25.

At least a part of the historical tire gas information relates to a tire for which an optimum inflation pressure is to be determined (the current tire). In some examples all of the historical tire gas information relates to the current tire. In such examples the selected time period may begin at a time at which that tire was installed on the aircraft. In some examples at least a part of the historical tire gas information relates to a different tire of the aircraft which is or has been installed on a different wheel of the aircraft to the current tire. In such examples the different tire is of the same type as the current tire. In other examples, at least a part of the historical tire gas information may relate to a previous tire of the aircraft. In such examples the previous tire is a tire that was installed on the same wheel of the aircraft as the current tire, before the current tire was installed. The previous tire may be the same type of tire as the current tire. The previous tire may have substantially identical physical characteristics to the current tire. In some examples the historical tire gas information may relate to multiple previous tires, each of which was installed on the same wheel of the aircraft as the current tire, before the current tire was installed.

The historical schedule information on which the stored tire gas-schedule information is based may comprise values of one or more schedule parameters over the selected time period. These may include or be the same as the aircraft schedule parameters to which the stored tire gas-schedule information relates tire gas properties. Alternatively, the schedule parameters comprised in the historical schedule information may be parameters from which the aircraft schedule parameters to which the stored tire gas-schedule information relates tire gas properties can be derived.

In examples in which the stored tire gas-schedule information comprises one or more look-up tables, the (or each) of which links a historical tire gas parameter relating to a given time (comprised in the historical tire gas information) to at least one historical schedule parameter relating to the same given time (comprised in the historical schedule information). For example, a look-up table might link adjusted tire gas pressure (that is, tire gas pressure values which have been adjusted to account for the temperature at the time each pressure value was measured) to the time of day of the pressure measurement. Such a look-up table may be provided in respect of each of multiple routes operated by the aircraft. There are many other ways in which tire gas properties and aircraft schedule parameters might be linked by one or multiple look-up tables, which will not be listed here.

In examples in which the stored tire gas-schedule information comprises a mathematical relationship linking the tire gas properties to the aircraft schedule parameters, the mathematical relationship has been derived using the historical tire gas information and the historical schedule information. The mathematical relationship may be configured such that inputting future values of one or more schedule parameters results in a predicted future tire pressure value. The mathematical relationship may be configured such that inputting future values of one or more schedule parameters results in a predicted future tire pressure value and a predicted future tire gas temperature value. The mathematical relationship may be derived using any suitable technique known in the art.

In some examples the stored tire gas-schedule information comprises a machine learning algorithm, configured for implementation by the controller 11. Machine learning is a form of data analysis in which a model is automatically created by an algorithm, based on the algorithm identifying patterns in training data without being given any explicit instructions. The machine learning algorithm may be supervised, meaning that it has been trained on data comprising labelled example input-output pairs. Alternatively the machine learning algorithm may be unsupervised, meaning that it is configured to find previously unknown patterns in an unlabelled data set.

In examples in which the stored tire gas-schedule information comprises a machine learning algorithm, the machine learning algorithm has been trained using the historical tire gas information and the historical schedule information. In addition to the historical tire gas information and the historical schedule information, the machine learning algorithm may be trained using historical flight-tracking information and/or historical weather information. Each type of historical information comprises a set of parameter values covering the selected time period, where each parameter value is associated with a particular time point.

The historical flight-tracking information may be obtained from a flight-tracking service such as Flight Radar 24. It may comprise some or all of the same parameters as the historical schedule information, as well as additional parameters. Where the historical flight-tracking information contains parameters which are the same as parameters contained in the historical schedule information, the machine learning algorithm may be configured to ignore those parameters in the historical schedule information, since the flight-tracking information reflects the flights actually operated by the aircraft (which may deviate from the flights that were scheduled for that aircraft) and is therefore more accurate.

The historical weather information the historical weather information is indicative of weather conditions at locations in which the aircraft was operating during the selected time period, at times when the aircraft was at those locations. The historical weather information comprises weather data recorded during the selected time period. The weather data may include values for a variety of parameters, such as temperature, humidity, atmospheric pressure, precipitation state, or any other weather-related parameter. The historical weather information may be obtained from one or more public ally available sources, for example weather reports produced by national meteorological services in the countries in which the aircraft was operating during the selected time period. In examples in which the machine learning algorithm has been trained using historical weather information, the tire inflation optimisation apparatus 1 may be configured to additionally receive future weather information comprising predicted weather parameters for the time period covered by the received future schedule information, for locations in which the aircraft is scheduled to operate during that time period, and to base the determination of the optimum inflation pressure additionally on the received future weather information.

The memory 12 additionally stores a reference pressure for the current tire. The reference pressure is the ideal operating pressure for the tire, assuming maximum permitted loading of the aircraft, at room temperature and pressure (rtp). Its value is set in dependence on the type of the tire and on the type of the aircraft. The recommended inflation pressure prescribed by the AMM of an aircraft is set as a percentage of the reference pressure (typically 105%). The tire inflation optimisation apparatus 1 may be configured to determine an optimum inflation pressure as a percentage of the reference pressure, as will be explained further below.

As mentioned above, the optimum inflation pressure for an aircraft tire varies according to the weight of the aircraft, such that a higher inflation pressure is preferred for a greater weight. The weight of an aircraft may vary between flight cycles, depending on factors such as how popular the given route is at a particular, time of day, day of the week, and/or time of year, and/or the destination. For example, an aircraft operating a summer holiday route at a weekend may generally operate at maximum weight, whereas on the same flight mid-week or out of season it may generally be somewhat below maximum weight. The weight variation is therefore predictable, to at least some extent, based on schedule information. In some examples the tire inflation optimisation apparatus 1 is configured to additionally base its determination of the optimum inflation pressure on aircraft weight. In such examples the memory 12 may additionally store weight-schedule information relating aircraft weight to aircraft schedule parameters.

The weight-schedule information may be stored in any of the forms described above in relation to the tire gas-schedule information. The weight-schedule information may generally have the same features as the tire gas-schedule information, except that weight values instead of temperature and pressure values are linked to schedule parameter values. The weight-schedule information may comprise or be based on the historical tire gas information, in combination with load measurements acquired by one or more load sensors provided on the aircraft. For example a load sensor may be provided on each wheel assembly, or on each landing gear of the aircraft.

In some examples the memory 12 may further store tire gas-weather information relating the tire gas properties to weather conditions. As discussed above, the weather will affect the temperature and pressure of the tire gas, and will typically vary between and within flight cycles in a manner that is not predictable based on the schedule information. The tire gas-weather information may be stored in any of the forms discussed above in relation to the tire gas-schedule information. The tire gas-weather information may generally have the same features as the tire gas-schedule information, except that weather parameters values instead of schedule parameter values are linked to tire temperature and pressure values. The tire gas-weather information may be based on historical weather information and historical tire gas information having the features discussed above.

The tire inflation optimisation apparatus 1 may comprise a functional module of a multi-functional device, such as a general-purpose computer or a multi-functional aircraft maintenance device, in which case the controller 11 may be embodied by a processor of the multi-functional device. The tire inflation optimisation apparatus 1 may be comprised in a portable device such as a tablet computer or a dedicated portable maintenance device.

The controller 11 is configured to receive future schedule information. The future schedule information is indicative of a future flight schedule for the aircraft. The schedule information covers a particular time period, which may be defined in terms of flight cycles of the aircraft, or in terms of calendar days. The received future schedule information may cover at least a maximum time period until the next inflation of the tire. Aircraft tires are inflated at replacement of the tire, and as necessary between tire replacements. The tire pressure is generally checked once a day, when the tires are cold. For a commercial airliner, reinflation is typically required every 1-3 days, although it is possible this could be as long as 10 days. The received future schedule information may therefore cover a 10 calendar day period.

The received future schedule information comprises a plurality of schedule parameters, which may be the same schedule parameters comprised in the stored historical schedule information. Indeed, out-of-date future schedule information may be stored in the memory 12 as historical schedule information. The future schedule information may be obtained from the same source as the historical schedule information, which may generally be the airline operating the aircraft. Updated future schedule information may be received from the source periodically, by any suitable means. The updated future schedule information may be stored on the memory 12 by the controller 11. In some examples the controller 11 may be configured to retrieve the future schedule information immediately prior to each new optimum inflation pressure determination.

The controller 11 is configured to use the received future schedule information, the stored tire gas-schedule information, and the stored reference pressure to determine an optimum inflation pressure for the tire. The controller 11 may also be configured to determine an optimum reinflation threshold for the tire based on the received future schedule information, the stored tire gas-schedule information, and the stored reference pressure. In such examples the optimum reinflation threshold is set such that, when the pressure of the tire is measured to be less than the reinflation threshold during a routine check, reinflation of the tire is triggered. The principles upon which the determination process performed by the controller 11 is based will now be explained with reference to FIGS. 3a and 3b.

Figure 3A:
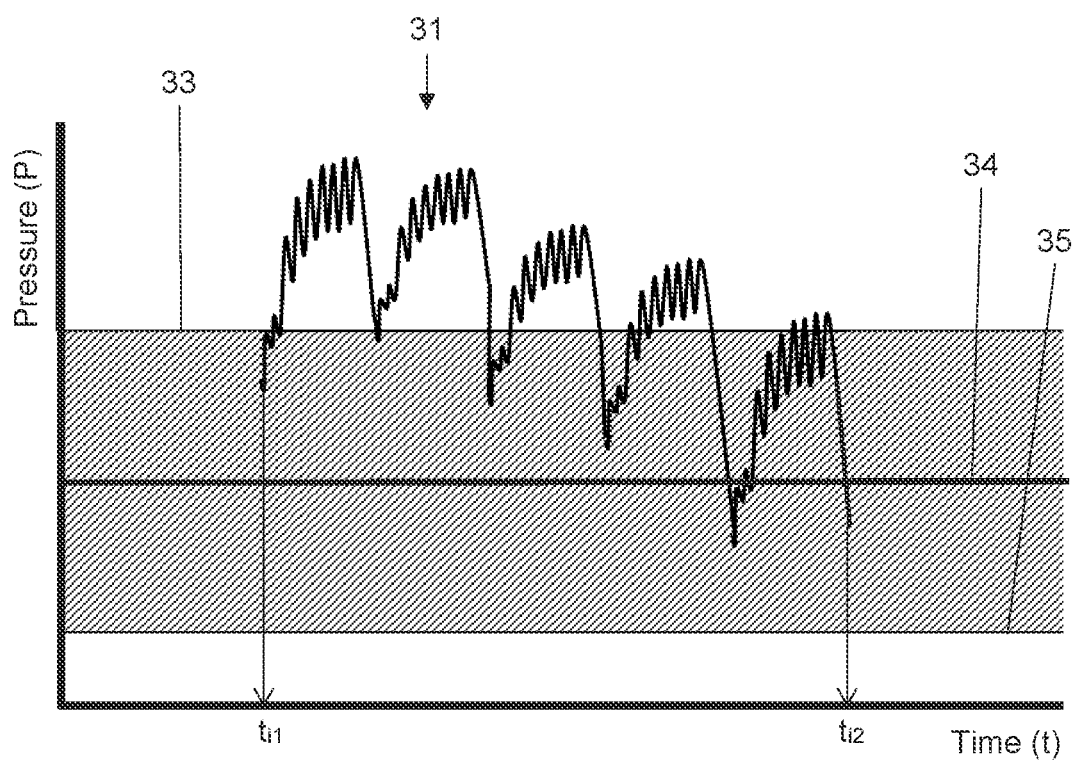
FIG. 3a is an example tire pressure profile for an aircraft tire inflated to a non-optimised inflation pressure.

FIG. 3a shows how the tire pressure of a particular aircraft tire varies between reinflations. The line 31 plots a time series of tire gas pressure measurements, and may therefore be considered to be a pressure profile for the tire. The pressure values are absolute (that is, they are the actual pressures measured by a pressure sensor on the wheel and have not been adjusted to account for the temperature of the tire gas at the time of measuring). The bold horizontal line 34 represents the reference pressure for the tire, whilst the fine horizontal lines 33 and 35 represent 105% of the reference pressure and 95% of the reference pressure respectively. The region between the lines 33 and 35 is considered to be the ideal pressure range for the tire. At $t_{i1}$ the tire is inflated to 105%. It is not then reinflated until $t_{i2}$, because until to, the pressure has not been below 100% of the reference pressure (which represents a reinflation threshold) at the time of the scheduled tire pressure check. It can be seen that between $t_{i1}$ and $t_{i2}$ the tire pressure undergoes significant cyclic variation, with an overall decreasing trend.

Most of the cyclical pressure variation is caused by variation in the temperature of the tire gas, which is caused by changes in the ambient temperature, heat generated by rolling of the tire, and heat generated by braking (if the tire is on a braked wheel). Each small peak represents a flight cycle of the aircraft, during which there is an overall small increase in pressure due to an overall temperature increase of the tire gas due to the heat generated by the brakes during landing and taxiing. The broad peaks represent calendar days. There are seven small peaks contained within each broad peak, since the particular example aircraft performed seven flight cycles per day during the time period covered by the pressure profile 31. The temperature (and therefore the pressure) of the tire gas decreases significantly between calendar days, because the aircraft is left to stand overnight and the tire gas experiences no heating effects during these periods. The overall decreasing trend of the pressure profile 31 is caused by tire gas gradually leaking out over time.

The pressure profile 31 of FIG. 3a is representative of a tire on an aircraft which performs a relatively high number of flight cycles per day, such that the tire gas does not cool to the ambient temperature between each flight cycle. This results in the tire pressure being above 105% of the reference pressure (and therefore outside of the ideal pressure range) for a significant proportion (more than half) of the period $t_{i1}$ to $t_{i2}$. Similar pressure profiles would be seen for aircraft which are mostly operated at less than maximum weight, and for aircraft operating in extreme temperatures.

Figure 3B:
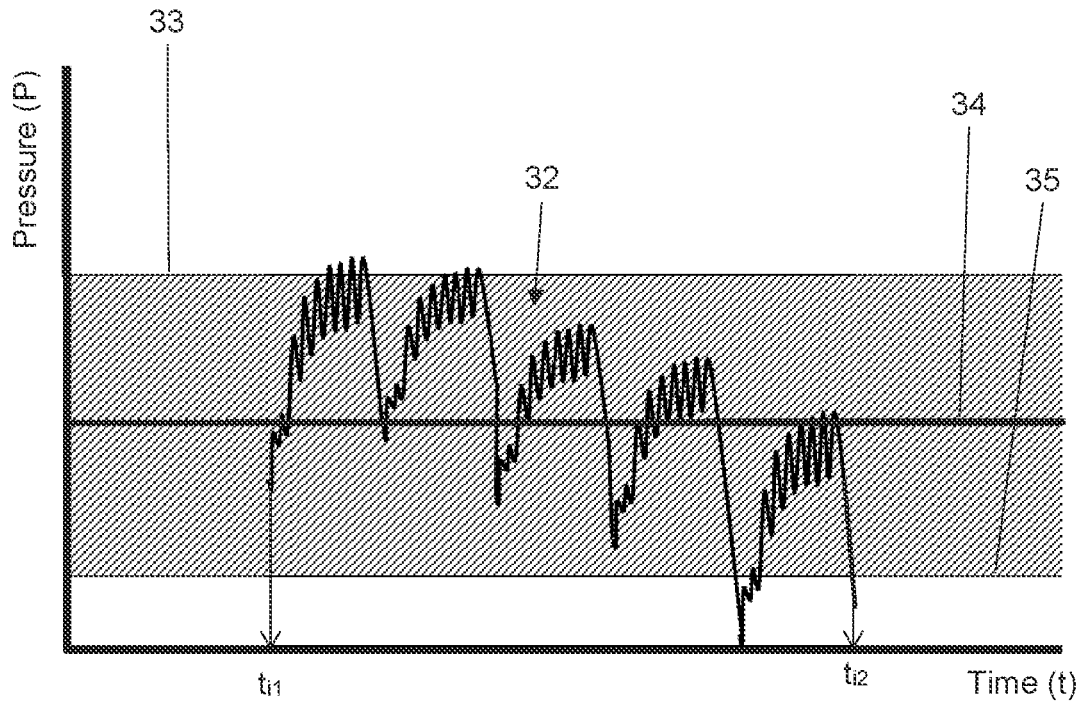
FIG. 3b is an example tire pressure profile for an aircraft tire inflated to an optimised inflation pressure determined according to the invention.

FIG. 3b shows a pressure profile 32 for the same aircraft tire performing the same flights, except that in this example at $t_{i1}$ the tire was inflated to 99% of the reference pressure. It can be seen that for almost all of the time period between $t_{i1}$ and $t_{i2}$ the tire pressure is in the ideal range between the lines 33 and 35. In this example the reinflation threshold has also been set lower than in the FIG. 3a example, at 95% of the reference pressure. Because of the timing of the pressure checks, this has meant that the tire has spent a short period in a slightly underinflated state. This may be acceptable, for example if the aircraft will be significantly below its maximum weight during the period of underinflation. However; such periods of underinflation can be avoided by setting the reinflation threshold to be slightly higher, at say 96%-98% of the reference pressure.

Figure 4:
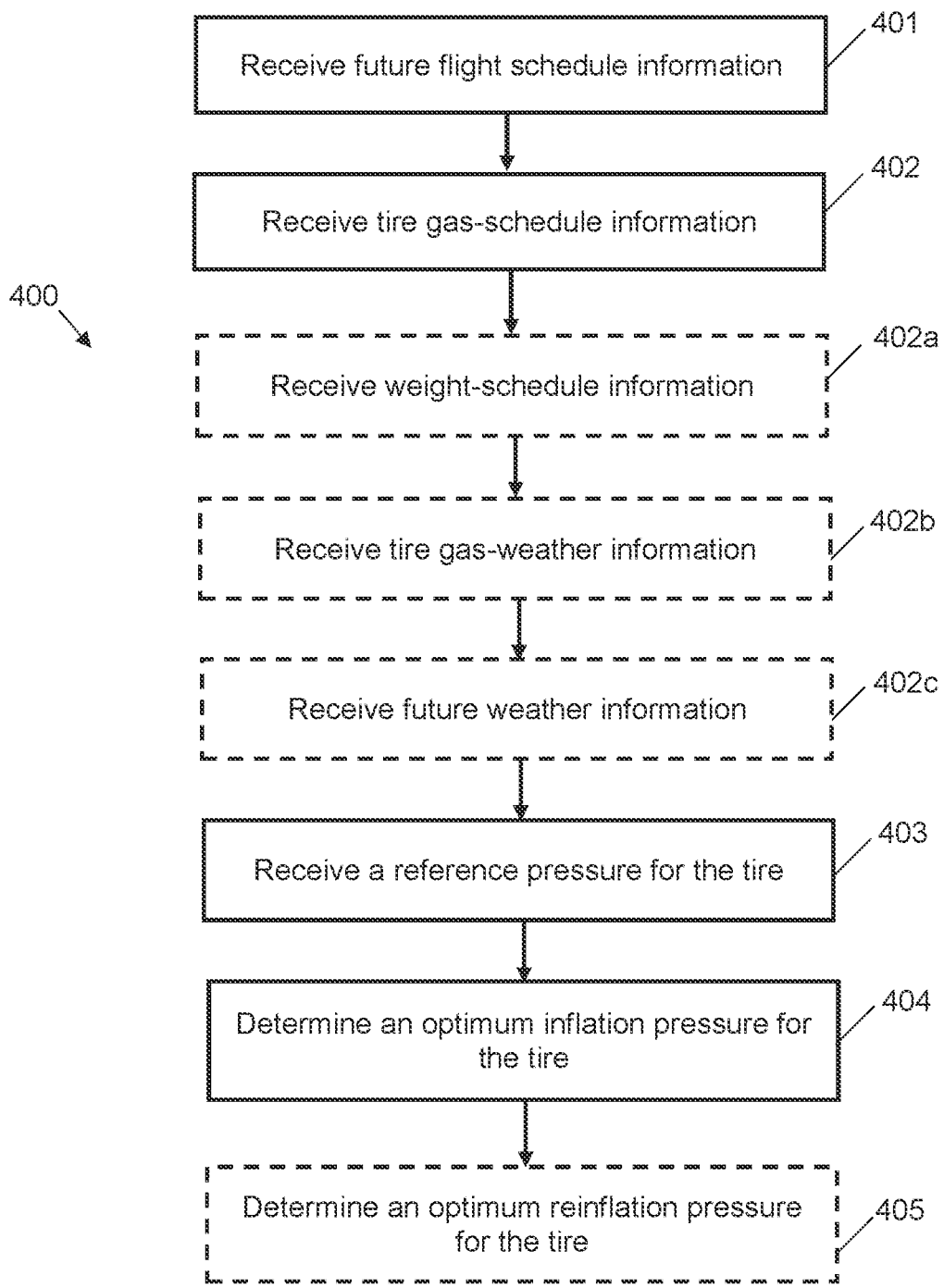
FIG. 4 is an example method of determining an optimum inflation pressure for an aircraft tire according to the invention.

FIG. 4 is a flow chart illustrating a method 400 of determining an optimum inflation pressure for an aircraft tire. The controller 11 of the tire inflation optimisation apparatus 1 may be configured to perform the method 400 in order to determine an optimum inflation pressure. The method 400 may be stored in the memory 12 in the form of computer program instructions. The controller 11 may be configured to initiate the method 400 when the tire is inflated or reinflated, in which case the resulting optimum inflation pressure is for use at the next inflation or reinflation of the tire. Alternatively the controller 11 may be configured to initiate the method 400 in response to a need to inflate or reinflate the tire arising, for example when the tire pressure is measured to be below the predefined reinflation threshold. The controller 11 may be configured to initiate the method 400 at any time between two consecutive inflation times. Initiation of the method 400 may be done automatically by the controller 11 in response to certain predefined criteria being met, or it may be done manually by an operator via a user interface of the tire inflation optimisation apparatus 1.

In a first block 401 the controller 11 receives future flight schedule information relating to planned flights of an aircraft comprising the tire. The future flight schedule information is received in the manner described above, and has the features described above.

In block 402 the controller receives tire gas-schedule information relating tire gas properties to aircraft schedule parameters, such tire gas-schedule information having the features described above. The tire gas-schedule information is stored on the memory 12, and so the controller 11 receives the tire gas-schedule information from the memory 12.

In optional block 402a, the controller receives weight-schedule information relating aircraft weight to aircraft schedule parameters, the weight-schedule information having the features described above. The weight-schedule information is stored on the memory 12, and so the controller 11 receives it from the memory 12.

In optional block 402b, the controller 11 receives tire gas-weather information relating the tire gas properties to weather conditions, the tire gas-weather information having the features described above. The tire gas-weather information is stored on the memory 12, and so the controller 11 receives it from the memory 12. Optional block 402b is independent of optional block 402a, such that either, both or neither of blocks 402a and 402b may be comprised in a given example of the method 400.

In examples in which optional block 402b is performed, the method 400 comprises a further optional block 402c. In block 402c, the controller 11 receives future weather information. The future weather information comprises predicted future values of weather parameters. The weather parameters comprised in the future weather information are the same weather parameters to which the tire gas-weather information relates tire gas properties. The future weather information covers the same selected time period as the future schedule information. The future weather information may be received from the same source as the historical weather information, in any suitable manner.

In block 403 the controller receives a reference pressure for the tire, the reference pressure having the features described above. The reference pressure is stored on the memory 12, and so the controller 11 receives the reference pressure from the memory 12.

In block 404 the controller determines an optimum inflation pressure for the tire based on the received future flight schedule information, the received tire gas-schedule information and the received reference pressure. The controller 11 may be configured to determine the optimum inflation pressure by generating a predicted pressure profile for the tire for a time period covered by the received future schedule information, which may be the entire time period covered by the received future schedule information, or a shorter time period.

The controller generates the predicted pressure profile based on the stored tire-gas schedule information, in a manner appropriate to the nature of the stored tire-gas schedule information. For example, where the tire-gas schedule information is in the form of one or more look-up tables, the controller 11 is configured to look up tire pressure and temperature values corresponding to the schedule parameter values contained in the future schedule information. The controller 11 may be configured to generate the predicted pressure profile based on a nominal initial inflation pressure, which may be (but need not be) the reference pressure. The nominal initial inflation pressure is stored in the memory 22, and is used by the controller 11 to generate a predicted pressure profile during each process of determining an optimum inflation pressure performed by the controller 11.

The predicted pressure profile is generated additionally based on a nominal reinflation threshold that is stored in the memory 12. The nominal reinflation threshold may be (but need not be) the reference pressure. The controller 11 may be configured to determine a predicted reinflation time for the predicted pressure profile based on the nominal reinflation threshold. To do this, the controller 11 uses information relating to the timing of routine tire pressure checks that will be performed on the aircraft during the time period covered by the future schedule information. Such information may be comprised in the received future schedule information, or it may be stored on the memory 12. The controller 11 determines the predicted tire pressure at the times of each routine tire pressure check that will be performed during the time period covered by the future schedule information, and compares these predicted tire pressures to the nominal reinflation threshold. The earliest such time at which the predicted tire pressure is found to be lower than the nominal reinflation threshold is the predicted reinflation time.

In examples in which the method comprises optional blocks 402b and 402c, the controller 11 generates the predicted pressure profile additionally based on the received tire gas-weather information and the received future weather information. The controller 11 may do this in any manner suitable to the nature of the tire gas-weather information. For example, the controller 11 may be configured to calculate a time-series of weather correction factors for the temperature and pressure of the tire gas over the selected time period, using the tire-gas weather information and the future weather information. Predicted hot weather at a given time during the selected time period would, in such examples, result in a correction factor which increased the predicted tire gas temperature and pressure at that given time. Similarly, predicted cold weather would result in a correction factor which decreased the predicted tire gas temperature and pressure. The controller 11 would apply the calculated correction factors to the data points of the predicted pressure profile to generate a weather-adjusted predicted pressure profile. The weather-adjusted predicted pressure profile is then used in the subsequent stages of the determination. Various other ways in which the controller 11 could be configured to generate the predicted pressure profile based additionally on the tire gas-weather information and the future weather information are possible using techniques known in the art.

As a next stage in determining the optimum inflation pressure, the controller 11 is configured to compare the predicted pressure profile to a predefined ideal pressure range for the tire, which is stored on the memory 12. The predefined ideal pressure range is based on the received reference pressure. The predefined ideal pressure range may typically be 95% to 105% of the reference pressure. In particular, the controller 11 is configured to determine, using any suitable analysis technique, how much of the predicted pressure profile is outside of the predefined ideal pressure range (and in which direction). For the purposes of this determination, the controller 11 uses the portion of the predicted pressure profile between the time of initial inflation to the nominal initial inflation pressure and the predicted reinflation time.

In some examples the controller 11 is then configured to determine, based on predefined acceptability criteria stored in the memory 12, whether the amount of the predicted pressure profile which is found to be outside of the ideal pressure range is acceptable. The predefined acceptability criteria may be defined by the operator of the aircraft based on factors such as the type of aircraft, the route it is being used on, how many flight cycles per day it is scheduled to perform, or the like. For example the predefined acceptability criteria may be defined such that it is unacceptable for the predicted pressure profile to go below the lower limit of the ideal pressure range at any time, or for more than a predefined maximum amount of time. The predefined acceptability criteria may be defined such that it is unacceptable for the predicted pressure profile to go above the upper limit of the idea pressure range for more than a predefined maximum amount of time.

In examples in which the method 400 comprises optional block 402a, the controller is configured to base the determination of whether the amount of the predicted pressure profile which is outside the ideal pressure range is acceptable additionally on the received weight-schedule information. There are various ways in which the controller 11 may be configured to do this. For example, in respect of an "outlying" portion of the predicted pressure profile which lies outside of the ideal pressure range, the controller 11 may predict a weight of the aircraft over the time period of the outlying portion based on the received weight-schedule information and the received future flight schedule information. This may be done in any suitable manner appropriate to the nature of the weight-schedule information.

The controller 11 may then generate an acceptable pressure range based on the predicted aircraft weight. The ideal pressure range assumes a maximum weight, so a predicted aircraft weight which is less than the maximum weight will result in an acceptable pressure range which is different to the predefined ideal pressure range. In particular, the lower limit of the acceptable pressure range will be lower than the lower limit of the predefined ideal pressure range. The acceptable pressure range may be time-varying, if the predicted aircraft weight is time-varying. The controller 11 then determines whether the outlying portion of the predicted pressure profile is within the acceptable pressure range. If the outlying portion of the predicted pressure profile is within the acceptable pressure range the controller 11 is configured to determine that the predicted pressure profile is acceptable. If the outlying portion of the predicted pressure profile is not within the acceptable pressure range the controller 11 is configured to determine that the predicted pressure profile is unacceptable. The controller 11 could account for aircraft weight when determining whether the predicted pressure profile is acceptable in various other ways, based on computational techniques known in the art.

If the controller 11 finds that the predicted pressure profile is acceptable according to the predefined criteria, then the controller 11 may be configured to determine the optimum inflation pressure to be the nominal initial inflation pressure. However; in some examples the controller 11 may be configured to search for an adjusted inflation pressure value which results in less of the predicted pressure profile being outside of the ideal pressure range. The controller 11 may perform this search in any suitable manner. For example, if the predicted pressure profile based on the nominal initial inflation value is above the upper limit of the ideal pressure range for a significant amount of time, the controller 11 may incrementally reduce the initial inflation pressure value until the resulting predicted pressure profile fails to meet the predefined acceptability criteria. The lowest initial inflation pressure value for which the resulting predicted pressure profile meets the predefined acceptability criteria is then determined to be the optimum inflation pressure.

If the controller 11 finds that the predicted pressure profile is unacceptable according to the predefined acceptability criteria, the controller is configured to search for an adjusted inflation pressure value, which results in a predicted pressure profile which is acceptable according to the predefined acceptability criteria, in the manner described above. The resulting adjusted inflation pressure value may be determined to be the optimum inflation pressure value, or a further optimised value may be sought as described above.

In some examples the method 400 comprises an additional optional block 405. In optional block 405 the controller 11 determines an optimum reinflation threshold for the tire. In some examples in which the controller is configured to determine an optimum reinflation threshold, the memory 12 stores predefined inflation interval criteria, and the controller 11 is configured to determine, based on the predefined inflation interval criteria, whether the predicted reinflation time is acceptable. For example, some aircraft operators may wish to avoid having to reinflate the tire too frequently. The predefined inflation interval criteria may be defined by the operator of the aircraft. The predefined inflation interval criteria may comprise a minimum inflation interval, such that a predicted reinflation time which is later than the initial inflation time by less than the minimum inflation interval is determined to be unacceptable.

If the controller 11 finds that the predicted inflation time is acceptable according to the predefined inflation interval criteria, then the controller 11 may be configured to determine the nominal reinflation threshold to be the optimum reinflation threshold. However; in some examples the controller 11 may be configured to search for an adjusted reinflation threshold value which results in a later predicted reinflation time. The controller 11 may perform this search in any suitable manner For example, if the predicted reinflation time is too early according to the predefine inflation interval criteria, the controller 11 may incrementally reduce the reinflation threshold value until the resulting predicted reinflation time meets the predefined inflation interval criteria. The highest reinflation threshold value for which the resulting predicted reinflation time meets the predefined inflation interval criteria is then determined to be the optimum reinflation threshold.

The controller 11 is configured to respect the predefined acceptability criteria for the predicted pressure profile when searching for an optimised value of the reinflation threshold, such that only a reinflation threshold values which results in an acceptable predicted pressure profile is permitted to be determined to be the optimum reinflation threshold.

If the controller 11 finds that the predicted inflation time is unacceptable according to the predefined inflation interval criteria, the controller 11 is configured to search for an adjusted reinflation threshold value which results in a predicted reinflation time which is acceptable according to the predefined inflation interval criteria.

The controller 11 may be configured to perform blocks 404 and 405 simultaneously. In such examples, the controller 11 may search for a combination of an adjusted inflation pressure value and an adjusted reinflation threshold value which results in an acceptable predicted pressure profile and an acceptable predicted reinflation time. This may require a trade-off between the amount of the predicted pressure profile which is within the ideal range and the length of time until the predicted reinflation time. The controller 11 may be configured to give more weight to one or the other, depending, for example, on the preferences of the aircraft operator.

Upon the completion of the method 400, the controller 11 may be configured to output the determined optimum inflation pressure (and, if available, the determined optimum reinflation threshold) in any suitable manner, such that it is available to a vehicle operator and/or a further system of the vehicle. For example, the controller 11 may be configured to cause a display of the tire inflation optimisation apparatus to display the determined optimum inflation pressure (and, optionally, the determined optimum reinflation threshold).

Figure 5:
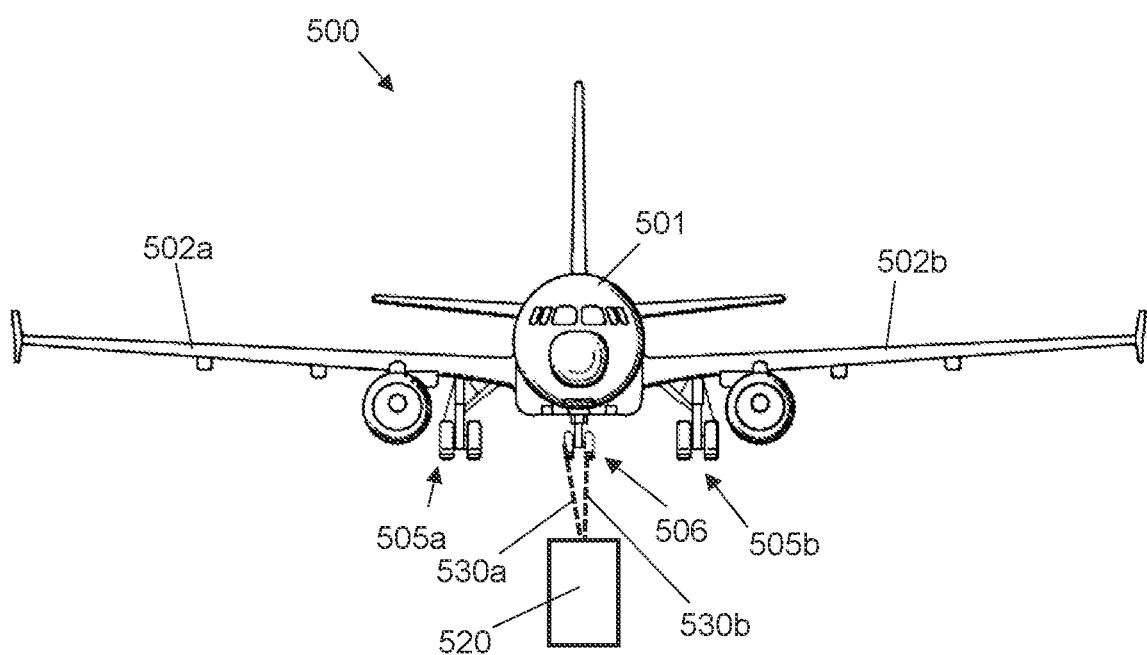
FIG. 5 is an example aircraft and an example tire inflation optimisation apparatus according to the invention.

FIG. 5 shows an aircraft 500 suitable for use with a tire inflation optimisation apparatus according to the examples (e.g. the tire inflation optimisation apparatus 1). The aircraft comprises a fuselage 501 and a pair of wings 502*a*, 502*b*. The aircraft 500 is supported on the ground by a pair of main landing gear (MLG) 505*a*, 505*b* and a nose landing gear (NLG) 506. Each landing gear assembly 505*a*, 505*b*, 506 comprises a pair of wheel assemblies, each having the same general configuration as the example wheel assembly 20 of FIG. 2. The MLG wheel assemblies each comprise a brake (not visible). The NLG wheel assemblies do not comprise brakes.

Each wheel assembly comprises a sensor device having the features of the example sensor device 25 of FIG. 2. This aircraft has six wheel assemblies in total; four wheel assemblies as part of the MLG 505*a*, 505*b* and two wheel assemblies as part of the NLG 506. The aircraft 500 may therefore comprise up to six sensor devices in total. It will generally be advantageous to provide a sensor device on each wheel assembly of an aircraft. Other models of aircraft may have different numbers of wheel assemblies and hence different numbers of sensor devices. The aircraft 500 may additionally comprise one or more load sensors (not shown), configured to measure load in a manner suitable for determining a weight of the aircraft. In some examples the aircraft 500 comprises a load sensor on each landing gear 505*a*, 505*b*, 506.

The sensor devices on the aircraft 500 may be configured to communicate, either directly or indirectly, with a tire pressure optimisation apparatus 520 according to the invention. The optimisation apparatus 520 has the same features as the example optimisation apparatus 1 of FIG. 1. In the illustrated example, the optimisation apparatus 520 is comprised in a portable maintenance device. In the illustrated example the two sensor devices on the wheels of the NLG 506 are each configured to communicate with the optimisation apparatus 520 via wireless communication links 530*a*, 530*b*. The NLG sensor devices may receive data from the MLG sensor devices, and communicate the MLG data to the optimisation apparatus 520. Where the aircraft 500 comprises one or more load sensors, the NLG sensor devices may additionally receive data from the one or more load sensors and communicate the load data to the optimisation apparatus 520. Other examples are possible in which a different sensor device is configured to communicate with the optimisation apparatus 520, or in which each sensor device on the aircraft communicates separately with the estimation apparatus 520.

The aircraft 500 also comprises various further systems, including an avionics system, which may be in communication with at least one of the sensor devices. The tire inflation optimisation apparatus 520 may be configured to communicate with one or more of these further aircraft systems.

In some alternative examples, the tire inflation optimisation apparatus may be comprised in an on-board system of the aircraft 500, rather than an off-board device.

Although the invention has been described above with reference to one or more preferred examples or embodiments, it will be appreciated that various changes or modifications may be made without departing from the scope of the invention as defined in the appended claims.

Although the invention has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

The invention claimed is:

1. A tire inflation optimisation apparatus configured to determine an optimum inflation pressure for a tire installed on an aircraft, the apparatus comprising:
   a memory on which is stored:
   information relating tire gas properties to aircraft schedule parameters; and
   a reference pressure for the tire; and
   a controller configured to:
   receive future schedule information indicative of a future flight schedule for the aircraft;
   determine an optimum inflation pressure for the tire based on the received future schedule information, the stored information relating tire gas properties to aircraft schedule parameters, and the stored reference pressure;
   wherein the controller is further configured to determine an optimum reinflation threshold for the tire based on the received future schedule information, the stored information relating tire gas paroperties to aircraft schedule parameters, and the stored reference pressure, wherein the optimum reinflation threshold is set such that, when the pressure of the tire is measured to be less than the reinflation threshold during a routine check, reinflation of the tire is triggered.

2. A tire inflation optimisation apparatus according to claim 1, wherein the determined reinflation threshold corresponds to the determined optimum inflation pressure, in that the determined reinflation threshold is configured to trigger the first reinflation after an inflation to the determined optimum inflation pressure.

3. A tire inflation optimisation apparatus according to claim 1, wherein the tire gas properties are temperature and pressure.

4. A tire inflation optimisation apparatus according to claim 1, wherein the aircraft schedule parameters include any combination of: airline operating the aircraft; departure airport; arrival airport; route; arrival time; departure time, arrival date, departure date.

5. A tire inflation optimisation apparatus according to claim 1, wherein the stored information relating tire gas properties to aircraft schedule parameters has been created based on historical tire gas information covering a selected time period and historical schedule information for the aircraft covering the selected time period.

6. A tire inflation optimisation apparatus according to claim 5, wherein the historical tire gas information comprises measured tire pressure values and corresponding measured tire gas temperature values.

7. A tire inflation optimisation apparatus according to claim 5, wherein at least a part of the historical tire gas information relates to the tire for which an optimum inflation pressure is to be determined.

8. A tire inflation optimisation apparatus according to claim 1, wherein a part of the historical tire gas information relates to a previous tire of the aircraft, the previous tire having been installed on the same wheel of the aircraft as the tire for which an optimum inflation pressure is to be determined, before the tire for which an optimum inflation pressure is to be determined was installed.

9. A tire inflation optimisation apparatus according to claim 5, wherein the stored information relating tire gas properties to aircraft schedule parameters comprises one or more look-up tables, each of which links a historical tire gas parameter to a contemporaneous historical schedule parameter.

10. A tire inflation optimisation apparatus according to claim 5, wherein the stored information relating tire gas properties to aircraft schedule parameters comprises a mathematical relationship linking the tire gas properties to the aircraft schedule parameters which has been derived using the historical tire gas information and the historical schedule information.

11. A tire inflation optimisation apparatus according to claim 5, wherein the stored information relating tire gas properties to aircraft schedule parameters comprises a machine learning algorithm which has been trained using the historical tire gas information and the historical schedule information.

12. A tire inflation optimisation apparatus according to claim 11, wherein the machine learning algorithm has been additionally trained using one or more of:
    historical flight-tracking information;
    historical weather information.

13. A tire inflation optimisation apparatus according to claim 1, wherein the received future schedule information covers at least a maximum time period until the next inflation of the tire.

14. A tire inflation optimisation apparatus according to claim 1, wherein the received future schedule information covers at least 3 days.

15. A tire inflation optimisation apparatus according to claim 1, wherein the received future schedule information comprises a plurality of schedule parameters, the schedule parameters comprising any combination of: airline operating the aircraft, departure airport, arrival airport, route, arrival time, departure time, arrival date, departure date.

16. A tire inflation optimisation apparatus according to claim 1, wherein the controller is further configured to receive current measured values of the tire gas temperature and tire gas pressure and current schedule information, and to update the stored information relating tire gas properties to aircraft schedule parameters based on the received current measured values and current schedule information.

17. A tire inflation optimisation apparatus according to claim 1, wherein the memory further stores weight-schedule information relating aircraft weight to aircraft schedule parameters, and the controller is configured to determine the optimum inflation pressure based additionally on the received weight-schedule information.

18. A tire inflation optimisation apparatus according to claim 1, wherein the memory further stores tire gas-weather information relating the tire gas properties to weather conditions, and wherein the controller is configured to receive future weather information for the time period covered by the received future schedule information and to determine the optimum inflation pressure based additionally on the received weather prediction and the stored tire gas-weather information.

19. A tire inflation optimisation apparatus according to claim 18, wherein the stored information relating tire gas properties to aircraft schedule parameters has been created based additionally on historical weather information covering the selected time period, the historical weather information being indicative of weather conditions at locations in which the aircraft was operating during the selected time period, at times when the aircraft was at those locations.

20. An aircraft comprising a tire in combination with a tire inflation optimisation apparatus according to claim 1 configured to predict an optimum inflation pressure for the tire.

21. An aircraft according to claim 20, further comprising a tire gas pressure sensor configured to measure a current pressure of gas in the tire and a tire gas temperature sensor configured to measure a current temperature of gas in the tire, and to provide tire gas pressure information and tire gas temperature information to the tire inflation optimisation apparatus.

22. A method of determining an optimum inflation pressure for an aircraft tire, the method comprising:
    receiving future flight schedule information relating to planned flights of an aircraft comprising the tire;
    receiving tire gas-schedule information relating tire gas properties to aircraft schedule parameters;
    receiving a reference pressure for the tire;
    determining an optimum inflation pressure for the tire based on the received future flight schedule information, the received tire gas-schedule information and the received reference pressure;
    wherein the method is configured to be performed by a controller of a tire inflation optimisation comprising:
    a memory on which is stored; information relating tire gas properties to aircraft schedule parameters; and a reference pressure for the tire; and a controller configured to; receive future schedule information indicative of a future flight schedule for the aircraft; and determine an optimum inflation pressure for the tire based on the received future schedule information, the stored information relating tire gas properties to aircraft schedule parameters, and the stored reference pressure.

* * * * *